Patented July 4, 1950

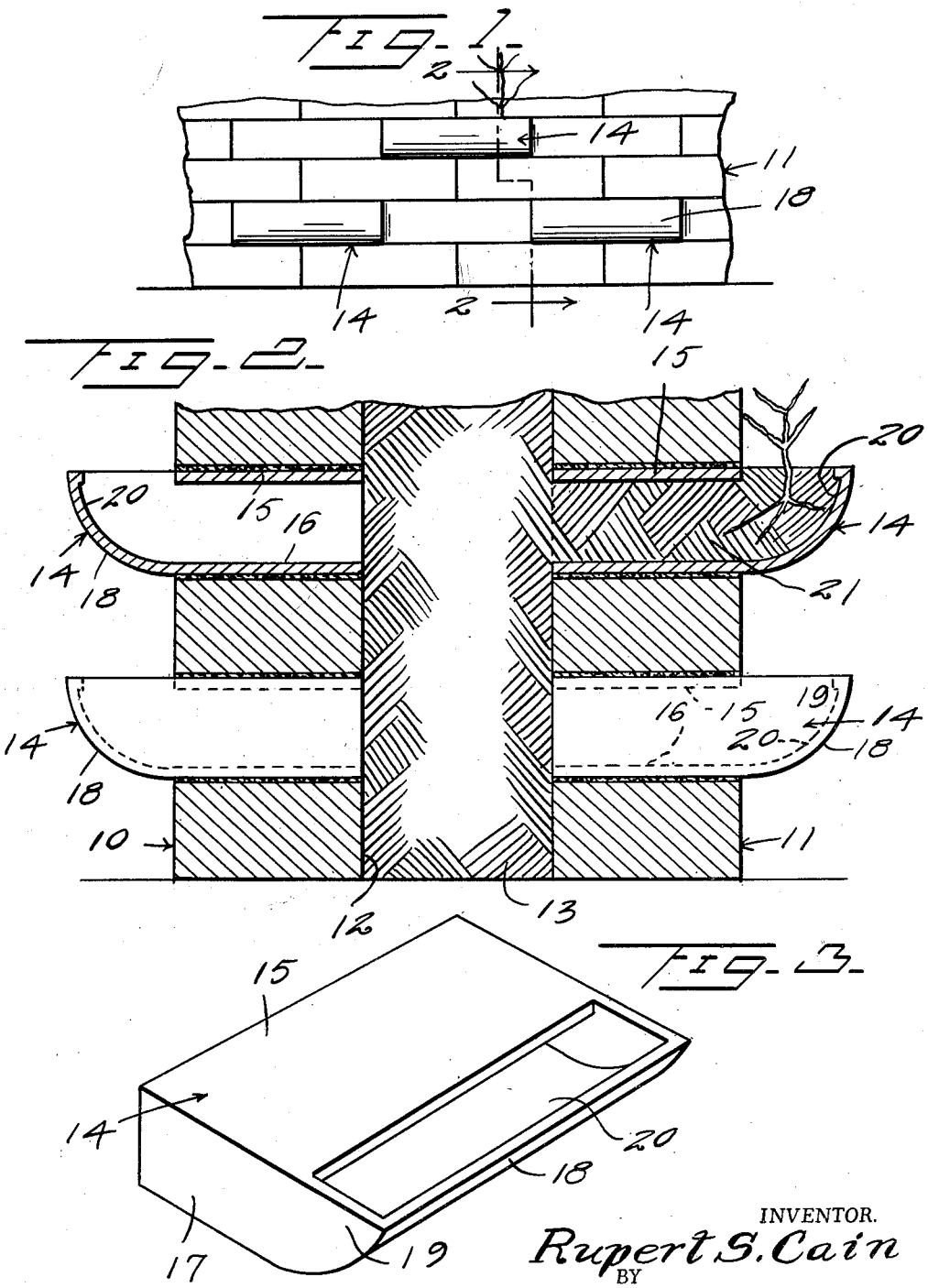

2,513,711

UNITED STATES PATENT OFFICE 2,513,711

PLANT GROWER BRICK

Rupert S. Cain, Spartanburg, S. C.

Application January 25, 1949, Serial No. 72,585

2 Claims. (Cl. 47—34)

This invention relates to a plant holder adapted for mounting in a wall.

An object of this invention is to provide in combination with a brick wall structure, a plant holder constructed of a size similar to the size of a brick or block for mounting in and forming a part of the wall structure, so that plants, such as strawberry, cucumber, tomato or other plants may be grown above the normal ground level.

Another object of this invention is to provide in combination a double brick or block wall structure with dirt between the walls, and with a plurality of hollow bricks or tiles which are open at their inner ends so that roots of the plants in the bricks or tiles may extend into the vertical dirt wall. Each hollow tile is formed with a projecting portion opening upwardly so that the plants may grow therefrom, and each hollow tile will be substantially filled with dirt so that the plants may readily grow therefrom.

With the above and other objects in view, my invention consists in the arrangement, combination and details of construction disclosed in the drawing and specifications, and then more particularly pointed out in the appended claims.

In the drawing,

Figure 1 is a fragmentary side elevation of a brick wall constructed according to an embodiment of this invention, showing several plant holders imbedded therein, Figure 2 is a fragmentary vertical section taken on the line 2—2 of Figure 1, Figure 3 is a perspective view of one of the holders.

Referring to the drawing, the numerals 10 and 11 designate generally a pair of vertically disposed brick walls which are spaced apart at their inner faces to provide a space 12 within which dirt 13 is adapted to be disposed. The brick walls 10 and 11 have imbedded therein a plurality of plant holders generally designated as 14 which are of a size substantially equal to the width, length and height of a brick block or tile, and the major portion of each holder 14 is disposed within the wall, being cemented to the bricks and forming a part of the wall structure.

Each holder 14 is formed of top and bottom walls 15 and 16 respectively, and opposite end walls 17. The top, bottom and end walls are of a size substantially equal to the width, height and length of a brick or block so that when the holder is in applied position within the walls, the actual edge of the top wall 15 will be substantially flush with the outer surface of the wall.

The bottom wall 16 is formed with an upwardly directed extension 18 which in the present instance is on an upward and outward curvature and the end walls 17 are formed with extensions 19 connecting with the bottom wall extension 18. The extensions 18 and 19 provide an open forward portion 20 in the holder, which is in the upper side so that dirt 21 may be placed within the holder 14 and a portion of the dirt will be exposed to the atmosphere beyond the outer edge of the top wall 15. Any suitable plants may be seeded or rooted in the dirt 21 and as the holder 14 is open at its inner end, the dirt 21 will mix with the dirt 13 in the wall structure so that the roots of the plant may be extended from the holder 14 into the vertical wall of dirt 13.

These holders may be made out of any suitable material such as fired clay, vitreous material, cast iron or the like. These holders are cemented or otherwise firmly imbedded into the wall structure and as shown in Figure 2, the wall structure is preferably double wall structure with a wall of dirt in the space between the spaced walls and after the holders 14 have been imbedded into the wall with the projecting portions extending from the outer side of the wall, the holders may be filled with dirt which will communicate with a vertical wall or column of dirt between the brick walls and plants, seeds or the like may be placed in the dirt 21 of the holders so that these plants will grow, and where the plants are in the form of vines the vines may drop downwardly from the holders.

I do not mean to confine myself to the exact details of construction herein disclosed, but claim all variations falling within the purview of the appended claims.

What I claim is:

1. In combination, a pair of spaced brick walls, dirt disposed between said walls, hollow plant holders of substantially the size of a brick used in said walls imbedded in said walls, said holders being open at their inner ends for communication with the dirt between said walls, each holder projecting from the outer face of a brick wall and formed with an upwardly directed open topped projecting portion whereby a plant may grow from said holder.

2. A plant holder adapted for mounting in a brick wall comprising a hollow member formed of upper, lower and side opposite end walls, an upwardly directed extension formed with said bottom wall, and a pair of forwardly projecting extensions formed with said side walls and integral with the ends of said bottom wall extension projecting beyond the edge of said top wall to form an upwardly facing, open projecting portion, said upper, lower and side walls being of a size substantially equal to the size of a brick whereby said holder may be imbedded in the brick wall with said extensions projecting therefrom, the end of said brick opposite the projecting extensions being open.

RUPERT S. CAIN.

REFERENCES CITED

The following references are of record in the file of this patent:

UNITED STATES PATENTS

| Number | Name | Date |
| --- | --- | --- |
| 262,335 | Wagner | Aug. 8, 1882 |
| 1,116,227 | Bolger | Nov. 3, 1914 |
| 1,217,239 | Swartz | Feb. 27, 1917 |
| 1,394,406 | Calvert | Oct. 18, 1921 |
| 1,740,057 | Babich | Dec. 17, 1929 |